Sept. 8, 1925.
S. I. CORY
1,552,470
MEANS FOR MEASURING TELEGRAPH DISTORTION
Filed Sept. 26, 1924
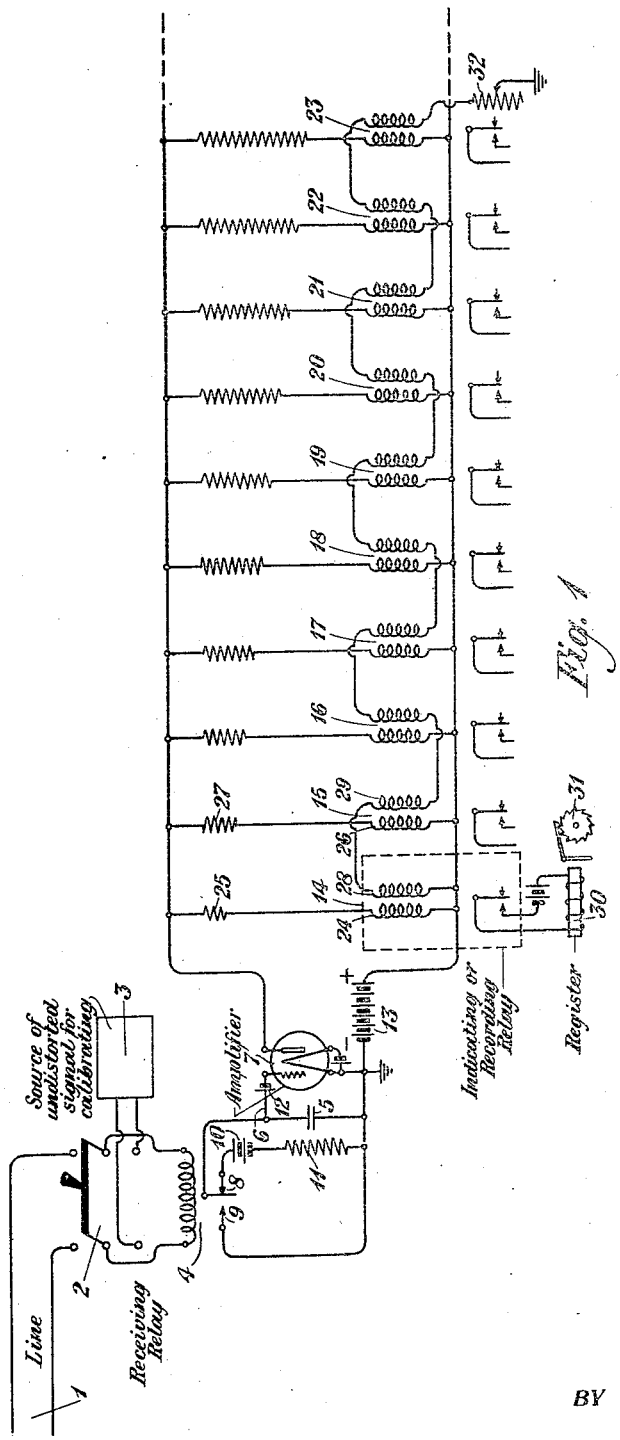
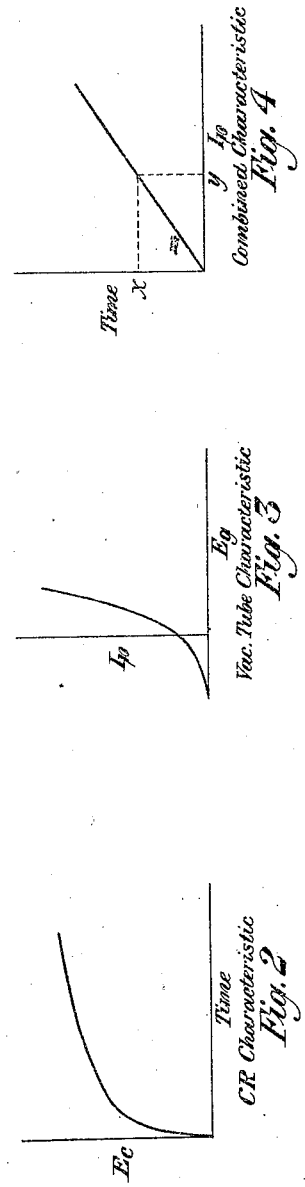
INVENTOR
S. I. Cory
BY
ATTORNEY Patented Sept. 8, 1925.

1,552,470

UNITED STATES PATENT OFFICE.

SAMUEL I. CORY, OF ELMHURST, NEW YORK, ASSIGNOR TO AMERICAN TELEPHONE AND TELEGRAPH COMPANY, A CORPORATION OF NEW YORK.

MEANS FOR MEASURING TELEGRAPH DISTORTION.

Application filed September 26, 1924. Serial No. 740,130.

*To all whom it may concern:*

Be it known that I, SAMUEL I. CORY, residing at Elmhurst, in the county of Queens and State of New York, have invented certain Improvements in Means for Measuring Telegraph Distortion, of which the following is a specification.

This invention relates to electrical measuring devices, and particularly to means for measuring the magnitude of distortion of telegraph signals.

As is well known to those skilled in the art, telegraph signaling impulses may be distorted in the process of transmission over lines, the distortion manifesting itself in a lengthening or shortening of the transmitted impulse as received. The apparatus heretofore used for the measurement of such distortion usually comprised synchronously operated mechanisms at the transmitting and sending ends of the lines. The mechanism at the receiving end comprised either an alarm or a registering device which indicated the presence of distortion in the received signal. A device of this type is shown in the co-pending application of Clark and Shanck, Serial No. 638,123, filed May 10, 1923. While such a device is capable of giving good results, it is necessary, of course, to maintain synchronism between the sending and receiving ends of the line which requires the necessary synchronizing apparatus.

It is the object of this invention to provide a method and means for measuring distortion of telegraph signals, which means do not require synchronous operation of the transmitting and receiving devices.

This invention will be clearly understood from the following description when read in connection with the attached drawing, of which Figure 1 shows schematically a form of embodiment of the invention; and Figs. 2, 3 and 4 illustrate graphically the principles upon which the invention is based.

In Fig. 1, the line 1 has connected with the distant end thereof a transmitting device for applying thereto signals the distortion of which is to be measured by the apparatus shown in Fig. 1. While any form of undistorted signal may be applied to the distant end of the line 1 for measurement at the receiving end, it is preferable to apply thereto a simple form of signal such as the letter E of the Morse code, which consists of a dot. The repetition of this letter will, of course, consist of a plurality of dots which should be of the same length and preferably equally spaced. The line 1 is connected with the upper contacts of the switch to the lower contacts of which is connected a source 3 of undistorted signals of the same character as those used for the line test for the purpose of testing or adjusting the apparatus of Fig. 1 prior to the measurement of the signals received from the line 1. The midpoints of the switch 2 are connected with the winding of the receiving relay 4. The tongue of this relay is connected with one side of a condenser 5, the magnitude of which is dependent upon the constants of the associated apparatus. The tongue of this relay is also connected by conductor 6 with the grid of the amplifier 7, the connection including the battery 12. The right-hand contact 8 of the receiving relay is connected with the source of potential 10, which, in turn, is connected through the resistance 11 with the filament of the amplifier 7, and also with the side of the condenser 5 opposite to that to which the tongue is connected. The left-hand contact 9 of the relay is connected with the said other side of the condenser 5. The batteries 12 and 13 supply the necessary grid and plate potentials for the proper operation of the apparatus.

Connected across the plate circuit of the amplifier 7 are the relays 14 to 23, inclusive, which, with their associated registers, such as 30, indicate the magnitude of the distortion of the received signals. Each of these relays has an operating and a biasing winding. Thus, for example, in relay 14 the operating winding 24 is connected in series with the resistance 25 between the battery 13 and the plate of the amplifier 7. The biasing winding 28 of this relay is connected in series with the biasing windings of the other relays, all of the said biasing windings being connected in series with the battery 13 and ground. The current through the biasing windings is controlled as to magnitude by the resistance 32, and it is in such direction as to keep the armatures of the respective relays upon their right-hand contacts. A plurality of registers, such as 30, are connected with the respective relays between the armature and the left-hand contacts thereof so as to be operated whenever the current through the operating winding reaches a predetermined value. These registers may be of any well-known type wherein a train of gears, such as 31, is actuated by the energization of the winding.

It will be seen that the plate current of the vacuum tube flows through a plurality of branches each containing the operating winding of a relay and a resistance such as 25. These resistances are of progressively increasing values in the successive branches from left to right so that at any instant the proportion of the total plate current in each branch is different, being greater in the branch toward the left than to the right. It should be borne in mind that the relays are biased to the same extent and therefore the current necessary to overcome such bias and to operate any relay is the same for all of the relays. Whenever any increase or decrease of the total plate current takes place due to variations of the grid potential, the amount of current in each branch varies. For example, if the total plate current is of such magnitude that the proportion flowing through winding 24 is just sufficient to overcome the bias of winding 28, relay 14 will operate, but none of the other relays will operate upon that value of total plate current.

Whenever the tongue of relay 4 is upon contact 8, the battery 10 is effectively connected across the plates of the condenser 5, thereby charging the said condenser. The time-voltage characteristic of this condenser is shown in Fig. 2. It will be seen that this is the voltage applied to the grid of the vacuum tube, the characteristic of which is shown by Fig. 3. By combining these two characteristics, the characteristic shown in Fig. 4 is obtained, which shows the approximate relationship between the plate current of the amplifier 7 and time. If the condenser has been charged for an interval of time represented by $x$, the resultant plate current will be of the magnitude represented by $y$. When the plate current reaches the value $y$, all relays whose operating value is within the limit represented by $y$ will be operated while those requiring more current will, of course, remain unoperated. The operation of the relays will be indicated by the operation of the registers.

Having in mind the foregoing description of the principles upon which this invention rests, the invention will be clearly understood from the following description of the mode of operation. With the switch 2 operated in its downward position, the source 3 of undistorted signals will be connected with the winding of the receiving relay 4. Let it be assumed that this source is applying to the said winding a series of undistorted E signals, viz, a succession of dots equal in length and uniformly spaced. Accordingly, when each dot is received, the tongue of the relay 4 will be moved to its contact 8, thereby connecting the source of potential 10 across the condenser 5 and charging it during the interval in which the current representing the dot continues to flow through the said winding. Upon the termination of the dot, the tongue will be swung to its contact 9 and will allow the condenser to discharge through the short-circuit thereby established. During the time in which the current representing the dot flows through the winding of relay 4, the potential of the condenser 5 is applied to the grid of the amplifier 7, and the magnitude of the plate current will be governed thereby. The potential across the said condenser will, of course, depend upon the time during which the source 10 is connected therewith, viz, if the signal is longer or shorter than normal, the said condenser will receive a charge greater or less than normal, which charge will be manifested by a corresponding variation in the plate current of the amplifier. Since the signals applied by the source 3 are undistorted, the magnitude of the resultant plate current is assumed to be the normal value, and the resistances, such as 25, 27, etc., are adjusted so that one-half of the relays, viz, 14 to 18, inclusive, will operate upon the resulting plate current. The successive relays 14 to 23, inclusive, should preferably be arranged to operate upon currents representing a difference in time intervals of approximately 5%. Thus, for example, if the current necessary to operate relays 14 to 18, inclusive, is the normal current resulting from an undistorted dot, the operation of a greater or less number of relays would represent a corresponding increase or decrease in the length of the received signal.

With the system calibrated by means of undistorted signals from the source 3, the measurement of signals received from the line 1 may now be made. The switch 2 is thrown upwards so as to connect the line 1 with the winding of the receiving relay 4. If a dot signal has been lengthened in transmission over the said line, the tongue of the relay will remain upon contact 8 longer than normal so that the condenser 5 will receive a charge greater than normal, and accordingly the potential upon the grid of the amplifier 7 will likewise be greater. If the normal current for an undistorted dot was sufficient to operate relays 14 to 18, inclusive, the dot which is longer than normal will operate a greater number of relays, as, for example, 14 to 20, inclusive. The operation of these relays would, of course, be manifested by the registers associated therewith, and the operation of relays 19 and 20 would indicate that the dot length was 10% longer than normal, and, in like manner, if the dot signal was shortened in the process of transmission, the charge upon the condenser 5 would be less than normal, and the plate current of the amplifier would likewise be less. When this condition prevails, the plate current will not be of sufficient magnitude to operate relays 14 to 18, inclusive. If the plate current operates only relays 14 to 16, inclusive, it will indicate that the dot length is 10% less than the normal length.

It will be seen, therefore, that the arrangement shown schematically in Fig. 1 is adapted to indicate the presence of distortion and the magnitude thereof. Furthermore, the arrangement is entirely independent of synchronism between the transmitting and receiving ends, and accordingly is a considerable improvement upon the devices of the prior art. With the device shown in Fig. 1, it is possible to measure at speeds higher or lower than the speed of calibration merely by changing the value of the biasing current by an amount inversely proportional to the change in speed, providing the straight-line characteristic shown in Fig. 4 holds throughout the range of speed over which the measurements are made.

While this invention is disclosed as embodied in a particular form, it is to be understood that it is capable of embodiment in other forms without departing from the spirit and scope of the appended claims.

What is claimed is:

1. In a system for measuring telegraph distortion, characterized by the lengthening or shortening of current impulses, the combination with a vacuum tube amplifier of a condenser connected with the grid of the amplifier and arranged to be charged through a resistance during the signal interval, and means responsive to the instantaneous value of the plate current of said amplifier to indicate the degree of distortion.

2. In a system for measuring telegraph distortion characterized by the lengthening or shortening of current impulses, the combination with a vacuum tube amplifier of an input circuit having a condenser in series with a resistance and a source of potential during each signal interval, and means connected with the output circuit of the amplifier responsive to the instantaneous value of the plate current to indicate the degree of distortion.

3. In a system for measuring telegraph distortion characterized by a lengthening or shortening of current impulses, the combination with a condenser of a source of potential and a resistance in series therewith, means responsive to the received signal impulses to control the application of the said potential to the said condenser, a vacuum tube having its grid effectively connected with the said condenser so that the potential of the latter will be applied to the said grid, and a plurality of relays connected with the output circuit of the said vacuum tube, the difference between the values of the operating currents of the successive relays being practically constant.

4. In a system for measuring telegraph distortion characterized by a lengthening or shortening of current impulses, the combination with a circuit having a source of signaling impulses connected therewith of a relay connected with the said circuit and controlled by the said impulses, a condenser and a resistance, a source of potential controlled by the said relay to charge the said condenser through the said resistance during the interval of operation of the said relay, a vacuum tube the grid of which is connected with the said condenser, and a plurality of relays connected with the output circuit of the vacuum tube and adjusted to operate at different current values.

5. In a system for measuring telegraph distortion characterized by a lengthening or shortening of current impulses, the combination with a circuit having a source of signaling impulses connected therewith of a relay connected with the said circuit and controlled by the said impulses, a condenser and a resistance, a source of potential controlled by the said relay to charge the said condenser during the interval of operation of the said relay, a vacuum tube the grid of which is connected with the said condenser, a plurality of relays connected with the output circuit of the vacuum tube and adjusted to operate at different current values, and a plurality of indicating means individual to and connected with the said relays to indicate their operation.

6. In a system for measuring telegraph distortion characterized by a lengthening or shortening of current impulses, the combination with a circuit having a source of signaling impulses connected therewith of a relay connected with the said circuit and controlled by the said impulses, a condenser, a resistance, a source of potential controlled by the said relay to charge the said condenser through the resistance during the interval of operation of the said relay, a vacuum tube, the grid of which is connected with the said condenser, the said vacuum tube having such a characteristic that the combined characteristic of the tube and condenser shows a straight-line relationship between the plate current and the time of charging the said condenser, and a plurality of relays connected with the output circuit of the said tube, the said relays being so adjusted that the difference in values of the operating currents of the successive relays is practically constant.

In testimony whereof, I have signed my name to this specification this 22nd day of September 1924.

SAMUEL I. CORY.